United States Patent [19]

Baumgarten

[11] Patent Number: 4,682,760

[45] Date of Patent: Jul. 28, 1987

[54] CONSTANT FORCE CABLE SELF ADJUSTING DEVICE

[75] Inventor: John M. Baumgarten, Saline, Mich.

[73] Assignee: Acco Babcock Inc., Fairfield, Conn.

[21] Appl. No.: 909,220

[22] Filed: Sep. 18, 1986

[51] Int. Cl.[4] .................. B21F 9/10; B60G 11/14; F16C 1/22
[52] U.S. Cl. .................. 254/199; 24/68 R; 24/71.1; 74/501.5 R; 267/20 R; 267/74
[58] Field of Search ............ 254/199, 201, 243, 247; 24/68 R, 68 B, 71.1; 192/111 A; 267/20 R, 20 A, 20 C, 74; 188/196 B, 196 F; 74/501.5 R

[56] References Cited

U.S. PATENT DOCUMENTS

| | | | |
|---|---|---|---|
| 444,006 | 1/1891 | Mason | 74/501.5 X |
| 572,054 | 11/1896 | Gross | 254/247 X |
| 1,247,760 | 11/1917 | Wengraf | 24/68 B |
| 1,469,788 | 10/1923 | Hellenthal | 267/20 R |
| 2,449,031 | 9/1948 | Woodson | 24/71.1 |
| 2,634,093 | 4/1953 | Hays | 24/71.1 X |
| 2,716,252 | 8/1955 | Mackie et al. | 74/501.5 X |
| 3,163,055 | 12/1964 | Jeffree | 74/501.5 |
| 4,344,510 | 8/1982 | Johannesen et al. | 192/111 A X |
| 4,381,053 | 4/1983 | Hyodo | 192/111 A |

FOREIGN PATENT DOCUMENTS 130295 2/1929 Switzerland .................. 24/71.1

Primary Examiner—Stuart S. Levy
Assistant Examiner—Joseph J. Hail, III
Attorney, Agent, or Firm—Barnes, Kisselle, Raisch, Choate, Whittemore & Hulbert

[57] ABSTRACT

A constant force self adjusting cable control device comprising a first member and a second member pivoted to one another about a pivot point, a tension spring connected to the first and second members and yieldingly urging the first and second members in a direction to cause movement about the pivot point and a cable attached to each of the first and second members. The cables are axially aligned such that the axis of the tension spring and the axis of the cables are substantially parallel. The angular displacement between the points of attachment of the spring and the cable and the pivot point on one member forms an angle equal to the angle of the point of attachment of the spring and the cable of the other member and the pivot point whereby substantially constant tension is provided on each of the cables. The device further includes a one-way latch which automatically releases when there is any slack in the cables thereby permitting relative movement between the two members until the tension on the cables is reestablished.

3 Claims, 6 Drawing Figures

SPRING DISADVANTAGE
4:1

C = CABLE FORCE X LBS.
S = SPRING FORCE 4X LBS.

SPRING DISADVANTAGE
3:2

C = CABLE FORCE X LBS.
S = SPRING FORCE 3/2 X LBS

CONSTANT FORCE CABLE SELF ADJUSTING DEVICE

This invention relates to devices for maintaining tension on a cable system.

BACKGROUND AND SUMMARY OF THE INVENTION

In the use of various cable systems involving cables, it is desirable to provide a self adjustment device for automatically adjusting and maintaining tension on the cables.

Prior methods of maintaining tension on cable controls have employed in line springs with no variation of mechanical advantage such as the mechanism seen in U.S. Pat No. 4,344,518. These mechanisms have been used to applying tension to a cable control through the inner member, the conduit and between the inner member and conduit.

There are two disadvantages of such prior art. The prior systems do not apply a constant force and consequently have a shorter adjustment length for their size. These systems employ a constant displacement ratio of spring movement to system movement. This causes the load applied to the system by the spring to diminish linearly with spring travel. If a small tolerance of system tension is required, the prior art of tensioning can only be used effectively for an equally small amount of travel.

The prior devices cause the system to be larger and heavier. Mechanical disadvantages of the spring force is not used. This makes the spring required for a given amount of travel in the tolerance limits larger than would be needed in a system using a mechanical disadvantage.

Among the objectives of the present invention are to provide a self adjusting cable control device that will provide a constant force on the cables, which is small, which is less expensive, and which provides a higher spring constant for the volume of the device.

In accordance with the invention, a constant force self adjusting cable control device comprising a first member and a second member pivoted to one another about a pivot point, a tension spring connected to the first and second members and yieldingly urging the first and second members in a direction to cause movement about the pivot point and a cable attached to each of the first and second members. The cables are axially aligned such that the axis of the tension spring and the axis of the cables are parallel. The angular displacement between the points of attachment of the spring and the cable on one member forms an angle equal to the angle of the point of attachment of the spring and the cable of the other member whereby substantially constant tension is provided on each of the cables. The device further includes a one-way latch which automatically releases when there is any slack in the cables thereby permitting relative movement between the two members until the tension on the cables is re-established.

DESCRIPTION

Figure 1:
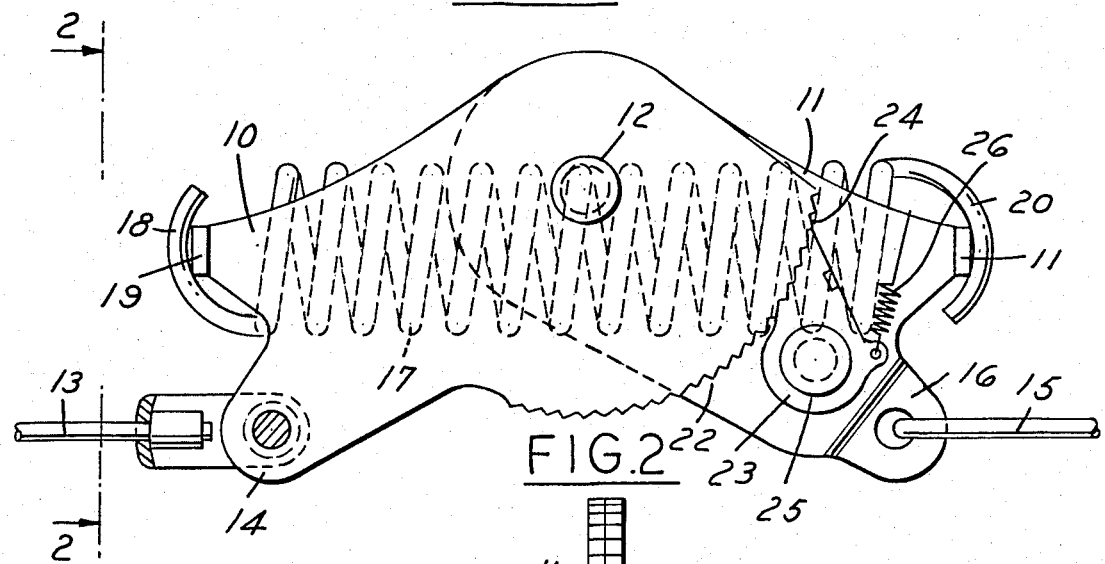
FIG. 1 is a plan view of the device embodying the invention.
Figure 2:
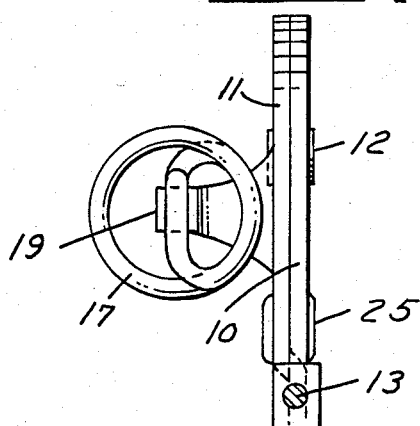
FIG. 2 is a sectional view taken along the line 2—2 in FIG. 1.
Figure 3:
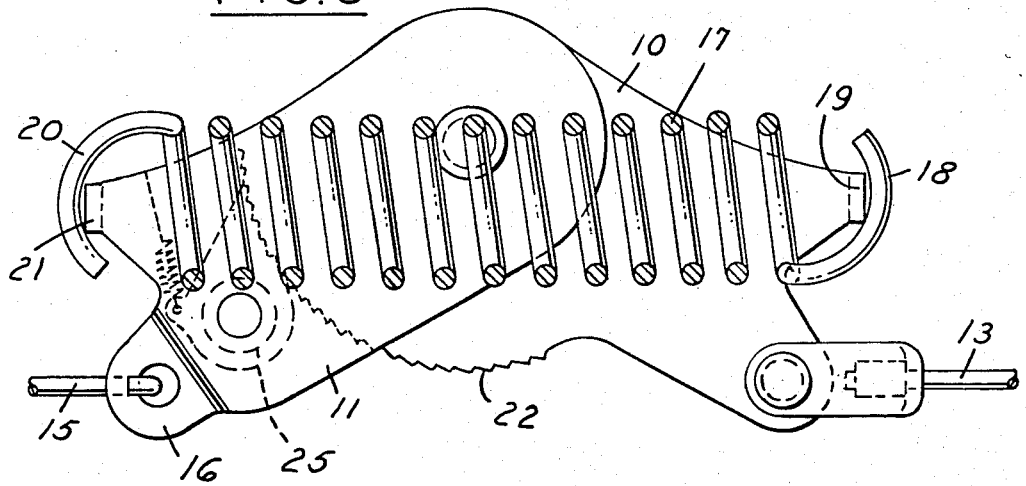
FIG. 3 is a bottom plan view of the device shown in FIG. 1.

Referring to FIGS. 1–4, the constant tension self adjusting cable device embodying the invention comprises a first generally triangular member 10 and a second generally triangular member 11 which are pivoted to one another by a pivot pin 12 that forms a pivot point or axis. A first cable 13 is attached to a projection 14 radially spaced from the pivot point 12 on the first member 10. Similarly a second cable 15 is attached to a projection 16 radially spaced from the pivot point 12 on the member 11. A tension spring 17 has an endmost loop 18 engaging a tab 19 on the member 10 and the other end having a loop 20 engaging a tab 21 on the member 11. Members 10, 11 are preferably made of metal stampings.

Figure 4:
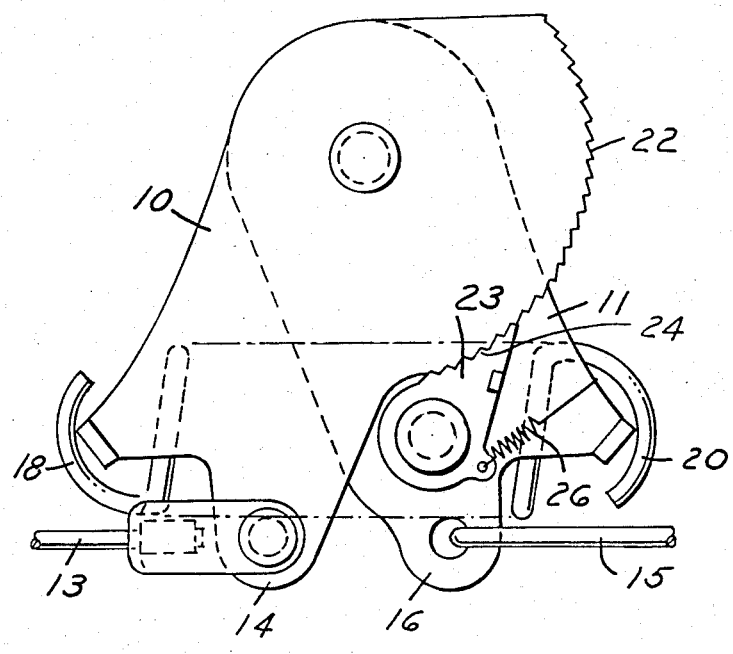
FIG. 4 is a view similar to FIG. 1 showing the parts in a different operative position.

A one-way latch is provided by a arcuate row of asymmetrical teeth 22 formed on the edge of the member 10 and a pawl 23 having complementary teeth 24 pivoted by a pin 25 on the member 11. A tension spring 26 yieldingly urges the teeth of the pawl into engagement with the teeth of the member 10. As slack occurs in the cables 13, 15, the spring 17 functions to cause the members 10 and 11 to pivot toward on another as shown in FIG. 4, the latch 23 pivoting into and out of engagement with the teeth until the tension on the cables 13, 15 is re-established.

Figure 5:
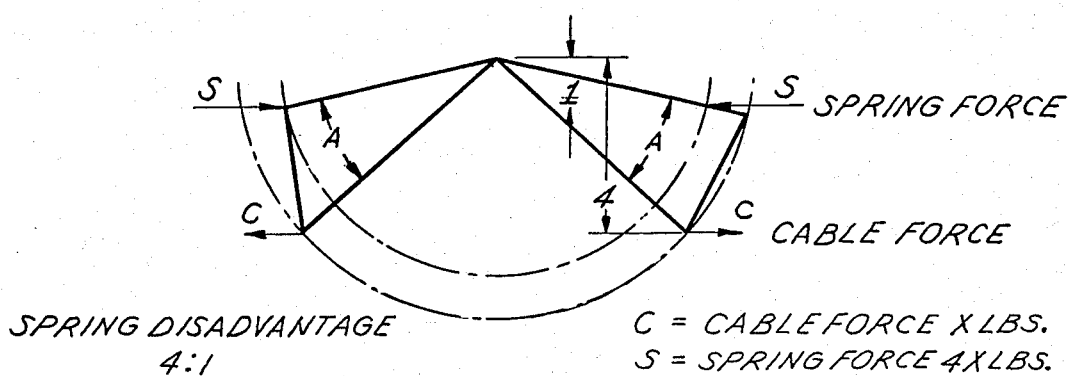
FIGS. 5 and 6 are diagrams indicating the relative positions of the device in different operative positions.
Figure 6:
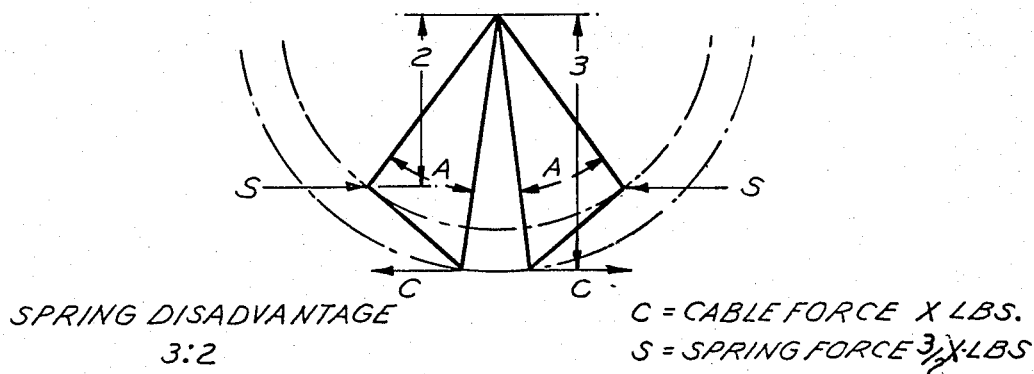

In accordance with the arrangement, the tension on the cables 13, 15 is maintained substantially constant. This can most easily be described by using FIGS. 5 and 6. The two shaped triangles A formed between the points of attachment of the spring 17 and cable on each member and the pivot point are rigid and rotate about a pivot as shown. The spring 17 provides a force at the point, in the direction and of the magnitude shown. The cable force direction, application point and magnitude are also shown. The triangles can only move together, not apart, due to the ratchet or latch.

Because of the off set angle "A" of force application, the lever arm and consequent mechanical disadvantage change as the triangles move together. Since the spring force changes an almost proportional amount, the two are offset and the force on the cable remains constant. It can be seen that the mechanism provides that the spring force is a multiple of the cable force X.

This can also be done with only one triangle. The other end of the spring could be anchored to a stationary point.

Due to the mechanical disadvantage of this mechanism, a higher spring constant can be used. In the current design a low spring constant must be used. A higher spring constant would make the mechanism much more compact.

I claim:

1. A constant force self adjusting cable control device comprising
   a first member and a second member pivoted to one another about a pivot point,
   a tension spring connected to the first and second members and yieldingly urging the first and second members in a direction to cause movement about the pivot point,
   a cable attached to each of the first and second members, said cables being axially aligned such that the axis of the tension spring and the axis of the cables are parallel, the angular displacement between the points of attachment of the spring and the cable on one member and the pivot point forming an angle equal to the angle of the point of attachment of the spring and the cable of the other member and the pivot point whereby substantially constant tension is provided on each of the cables, and a one-way latch which automatically releases when there is any slack in the cables thereby permitting relative movement between the two members until the tension on the cables is re-established.

2. The self adjusting cable device set forth in claim 1 wherein said coil spring has coils of constant diameter.

3. The self adjusting cable device set forth in claim 1 wherein each said member has an axially extending tab, each end of said spring being looped over a respective tab.

* * * * *